United States Patent [19]

Greenberg

[11] Patent Number: 5,072,539

[45] Date of Patent: Dec. 17, 1991

[54] FISHING POLE HOLDER

[76] Inventor: Philip J. Greenberg, 20622 Superior St., Unit 6, Chatsworth, Calif. 91311

[21] Appl. No.: 644,943

[22] Filed: Jan. 23, 1991

[51] Int. Cl.[5] .......................................... A01K 97/10
[52] U.S. Cl. ..................................... 43/21.2; 211/70.2
[58] Field of Search ................ 43/21.2; 248/512, 530; 211/70.8, 70.2

[56] References Cited

U.S. PATENT DOCUMENTS

| | | | |
|---|---|---|---|
| 699,391 | 5/1902 | Johnson | 211/70.2 |
| 2,482,372 | 9/1949 | Rossow | 211/70.2 |
| 3,421,632 | 1/1969 | Wood | 211/70.8 |
| 3,954,239 | 5/1976 | Kerbs, Jr. | 211/70.2 |
| 4,673,082 | 6/1987 | Hemme | 211/70.2 |
| 4,782,624 | 11/1988 | Head | 43/21.2 |

*Primary Examiner*—Richard K. Seidel
*Assistant Examiner*—Chuck Y. Mah
*Attorney, Agent, or Firm*—Edward E. Roberts

[57] ABSTRACT

A fishing pole holder fabricated with an elongate tubular member, threaded on a least one end, which serves as a main support. First and second disc members are attached centrally thereon in spaced relation adjacent one end of the support, the upper disc including circumferentially disposed apertures therein of the same or different sizes for receiving the handles of the fishing rods, the distal ends of which abut the other, or lower disc. The other end includes an upper rod retaining assembly, which includes a disc scalloped about the periphery thereof with a radially slit foam member sandwiched thereto, the scalloped disc having a member affixed at the center thereof for threadable attachment to the threaded end of the tubular member. In a first embodiment, the lower end of the tubular member is provided with a support in the form of an extension which depends below the lower disc for insertion into a mating receptacle which is affixed to the boat. In a second embodiemnt, both ends of the tubular member are threaded with the lower disc being threadably attached to the threaded end. Detachable threaded leg members are affixed to matingly threaded spacer members interposed between the two handle support discs. A carrying strap is attached to the support and one disc.

16 Claims, 1 Drawing Sheet

FISHING POLE HOLDER

BACKGROUND OF THE INVENTION

The background of the invention will be discussed in two parts.

1. Field of the Invention

This invention relates to stands for sporting apparatus, and more particularly to a fishing pole stand or holder which may be used to transport fishing rods, as well as to retain the rods in a compact arrangement on a fishing craft.

2. Description of the Prior Art

Fishing is a very popular sport. Most avid fisherman have many fishing rods, of different sizes and lengths, each having an intended purpose for different fish and fishing conditions. On one fishing expedition, a fisherman may take several rods along for personal use; and, in many instances may take along several rods for family members or others in the fishing party. Fishing rod and accessory organizers or caddies are popular accessories with fisherman.

One such fishing rod and reel caddy is disclosed in U.S. Pat. No. 4,311,262, entitled "Rod and Reel Caddy", such patent issuing on Jan. 19, 1982 to Morin. The caddy includes a box-like structure including first and second members spaced from a bottom support and from each other with the spaced members having openings therein aligned relative to one another for receiving a handle of a fishing rod. The openings are large enough to receive the rod handles but small enough to preclude the reel passing through. The apparatus includes a member which serves as a carrying handle.

U.S. Pat. No. 4,671,009. entitled "Boat Fishing Organizer Formed as Basket-like Structure With Attachment Means for Fishing Accessories", issued to Faunce on June 9, 1987, such patent disclosing a basket-like receptacle formed of an open rod or wire construction and having hooks configured for mounting on the gunwale of a boat, the receptacle including wire loop portions for retaining a fishing net, a projecting tube for receiving a spool of line, and a hook and projection for retaining a tube configured for receiving the handle of a fishing rod.

Another similar apparatus is shown and described in U.S. Pat. No. 4,696,122, entitled "Fishing Rod Holder/Carrier", such patent issuing to Van Der Zyl on Sept. 29, 1987, such patent disclosing a frame having first and second supports attached to opposite ends of the frame with legs operatively attached to the first support, one to each end thereof. A second set of legs are similarly attached to the other support, the two sets of legs enabling the apparatus to be placed on the floor of the bed of a truck or on a vehicle trunk floor. First and second clips are attached intermediate opposite ends of the frame for holding the fishing rods at spaced points.

Other devices for holding elongate objects, such as umbrellas and the like, are shown and described in U.S. Pat. Nos. 290,371 and 3,661,270, which are, respectively entitled "Show Stand" and "Collapsible Coat Rack-Umbrella Stand Unit, issued, respectively, to Udell on Dec. 18, 1883, and to Lucci et al. on May 9, 1972. These two patents are exemplary of the art of stands for elongate objects.

In accordance with an aspect of the invention, there is shown and described a new and improved fishing pole stand apparatus, formed of economically available components fabricated in an economical manner.

SUMMARY OF THE INVENTION

The foregoing and other objects of the invention are accomplished by providing a fishing pole holder fabricated, in a first embodiment from an elongate tubular member, threaded on a least one end, which serves as a main support. First and second disc members are attached in spaced relation adjacent one end of the support, the upper disc including circumferentially disposed apertures therein of the same or different sizes, configured and dimensioned for receiving the handles of the fishing rods, the distal ends of which abut the other, or lower disc. The other end includes an upper rod retaining assembly, which includes a disc scalloped about the periphery thereof with a radially slit foam member sandwiched thereto, the scalloped disc having a member affixed at the center thereof for threadable attachment to the threaded end of the tubular member.

In a first embodiment, the lower end of the tubular member is provided with an extension which depends below the lower disc for insertion into a mating receptacle which is affixed to the boat. A carrying strap is attached to the support and one disc. In a second embodiment, both ends of the tubular member are threaded with the lower disc being threadably attached to the threaded end. Detachable threaded leg members are affixed to matingly threaded spacer members interposed between the two handle support discs.

Other objects, features and advantages of the invention will become readily apparent from a reading of the specification, when taken in conjunction with the drawings, in which like reference numerals refer to like elements in the several views.

DESCRIPTION OF THE PREFERRED EMBODIMENT

Figure 1:
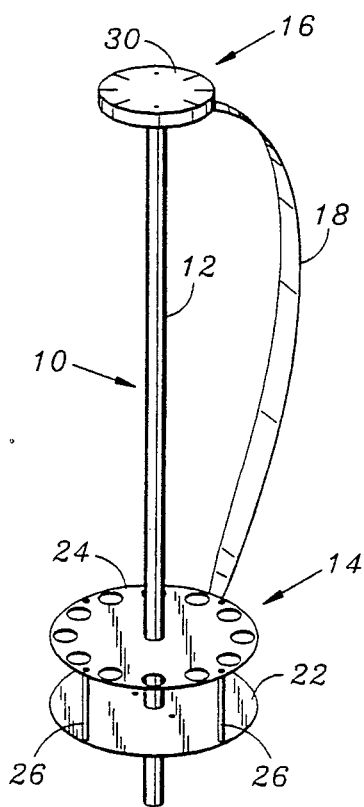
FIG. 1 is a perspective view of the fishing pole support apparatus according to the invention.

Referring now to the drawings, and particularly to FIG. 1, there is shown a fishing pole holder, generally designated 10, which includes a main support means in the form of tubular member 12, threaded at one end 12a (See FIG. 2), the tubular member 12 being formed preferably of aluminum. Attached at one end (the lower end) of the tubular member 12 is a handle receiving assembly, generally designated 14, with a rod retaining assembly, generally designated 16, attached to the threaded end 12a thereof. A suitable flexible carrying strap 18 is attached at one end to the rod retaining assembly 16 and, at the other end, to the handle receiving assembly 14.

Figure 2:
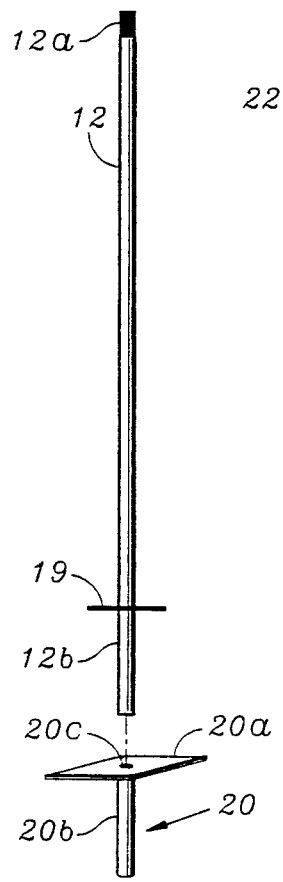
FIG. 2 is a perspective view of the support and receptacle assembly used in the apparatus of FIG. 1.

As shown in FIG. 2, the lower end of the tubular member 12 is provided with a depending extension 12b, which depends from the lower side of the handle receiving assembly 14, the end 12b being defined by a small rectangular plate 19 suitably affixed to the member 12 in spaced relation to the end thereof, such as by welding. The extension 12b is configured for being received with a receptacle device 20 which may be secured or installed into the floor of the fishing vessel. The device 20 includes a plate portion 20a and a tubular portion 20b secured in perpendicular relation thereto at the center thereof with the plate portion 20a having an aperture 20c therethrough in alignment with and the same diameter as the inner diameter of the tubular portion 20b. The diameters are slightly greater than the outer diameter of the extension 12b.

Figure 3:
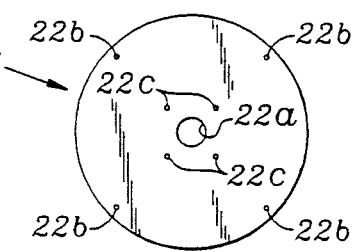
FIG. 3 is a plan view of one of the discs of the handle support portion of the apparatus of FIG. 1.
Figure 4:
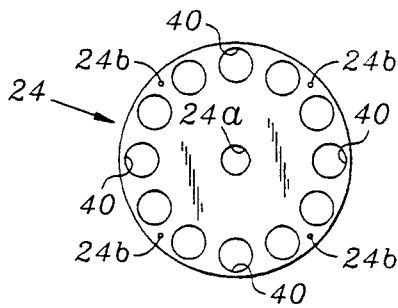
FIG. 4 is a plan view of the other of the discs of the handle support portion of the apparatus of FIG. 1.
Figure 5:
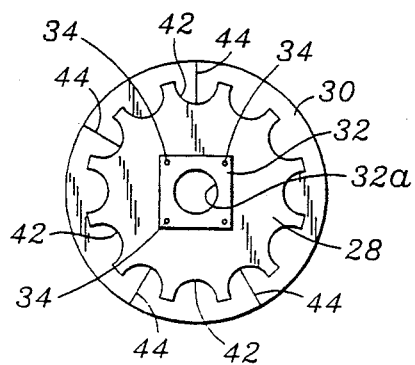
FIG. 5 is a bottom plan view of the rod holding assembly of the apparatus of FIG. 1.

The handle receiving assembly 14 is formed of first and second discs 22 and 24 (See also FIGS. 3 and 4) of substantially the same diameter and preferably formed of aluminum. Each of the discs 22 and 24 includes a central aperture 22a, 24a, respectively, each of which is the same diameter, which is slightly greater than the outer diameter of the tubular support member 12.

The assembly includes a plurality of, such as three or four, spacers 26 (only two of which are shown). The spacers 26 are formed of metal, such as aluminum, and are provided with axially aligned threaded openings at opposite ends thereof. The spacers 26 are positioned intermediate openings 22b and 24b of discs 22 and 24, respectively, which openings are dimensioned and positioned for alignment with one another with the discs 22 and 24 in spaced, generally parallel relationship. The lower disc 22 is also provided with inwardly positioned openings 22c adjacent aperture 22a, the openings 22c being dimensioned and positioned for securing disc 22 to the plate 19 of tubular support member 12, such as by sheet metal screws (not shown).

To assemble the handle receiving assembly, the lower disc 22 is slid over the support member 12, that is, the long threaded end 12a of support member 12 is inserted through the aperture 22a whereupon the openings 22c are aligned with suitably formed openings in the plate 19, and the screws affixed. The end 12a is then inserted through the aperture 24a of upper disc 24. The spacers 26 are then attached by alignment with respective ones of the openings 22b, 24b, and screws (not shown) are secured to the threaded openings for retaining the discs 22 and 24 in spaced relation attached to the tubular support member 12.

Rod retaining assembly 16 is formed as a sandwiched assembly consisting of a peripherally scalloped plate or disc 28 having a thick polyfoam disc 30 adhered to the upper surface thereof, such as by adhesive. The disc 28 is provided with a centrally disposed opening, aligned with an opening 32a of a plate 32 of thicker metallic material, the plate 32 being secured to the disc 30, such as by rivets 34. The central opening 32a of the plate 32 is threaded for coupling to the threaded end 12a of the tubular support member 12.

For retention of fishing poles, the upper disc 24 of the handle receiving assembly 14 is provided with a predetermined number of generally equiangularly spaced holes 40, with the circumference of the disc 28 of the rod receiving assembly 14 having a like number of equiangularly spaced arcuately configured cutouts or scallops 42, and the foam disc 30 being provided with a like number of radially extending slits 44 about the periphery thereof with the slits 44 being aligned generally with the centers of the scallops 42. For this purpose the diameter of the foam disc 30 is greater than the diameter of the disc 28 to enable frictional retention of the narrow upper shaft portions of the fishing pole within the slits 44 and within the scallops 42.

The fishing pole holder may then be used by loading it with any number of poles up to the maximum provided by the predetermined number of openings 24, with the lower ends of the handle abutting against the lower plate or disc 22 and the shafts or rods frictionally retained within the foam disc 30 of the rod retaining assembly 16. The fishing pole holder 10 may then be manually transported by means of the carrying strap 18 and, on board the fishing craft, may be inserted by insertion of the extension 12b into the receptacle 20 secured to the floor or deck of the craft.

Figure 7:
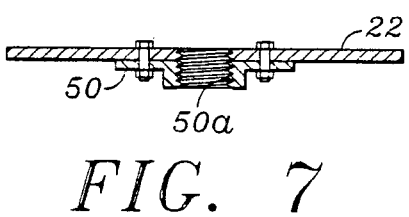
FIG. 7 is a cross-sectional view of one of the discs of the support of FIG. 7.
Figure 6:
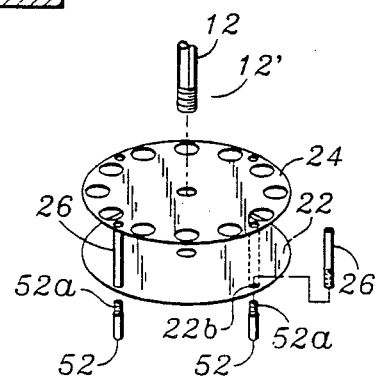
FIG. 6 is an exploded fragmentary perspective view of an alternative support for the apparatus of FIG. 1.

FIGS. 6 and 7 depict an alternate embodiment of a support means for the apparatus. Rather than having a support extension 12b, the lower end of the tubular member 12 is threaded at 12' for threadable insertion into a threaded flange plate opening 50a of a flange plate, suitably secured, such as by riveting to the lower surface of the lower disc 22 (See FIG. 7). In this embodiment, the discs 22 and 24 are otherwise identical to those described in the embodiment of FIGS. 1 through 5, and the rod retaining assembly 16 will be the same.

To enable the apparatus of FIGS. 6 and 7 to be supported, three or four short leg members 52 are provided, the number being the same as the number of spacers 26. The leg members 52 are provided with axially extending threaded studs 52a which are dimensioned for being received within the threaded openings of the lower ends of the spacers 26, the studs 52a being first inserted through the openings 22b of the lower disc 22 and then into engagement with the threaded openings of spacers 26 to thereby hold the handle receiving discs together, along with like fasteners inserted through openings 24b of upper disc 24 into engagement with the threaded openings of the opposite ends of spacers 26.

Although the construction of the fishing pole holder has been described as having metallic parts, it is to be understood that suitable medium or high strength plastic parts may be conveniently substituted. While there has been shown and described a preferred embodiment, it is to be understood that various other adaptations and modifications may be made within the spirit and scope of the invention.

What I claim is:

1. A fishing pole apparatus comprising:

a generally elongate central support member;

first and second discs secured at the centers thereof to said support member in spaced relation to one another adjacent one end of said support member, the first disc being furthest from said one end and having a plurality of circumferentially arranged openings dimensioned for receiving the handles of the fishing poles therethrough in abutting relation to the second disc;

a rod retaining assembly centrally disposed on and affixed adjacent the other end of said support member, said assembly including a disc member with the outer perimeter thereof having scalloped cutouts equal in number to the number of handle receiving openings in said first disc, and frictional means adjacent said disc member configured for frictionally retaining the shafts of the fishing poles therein in general alignment with the openings of said first disc and said support member; and support means on said one end of said support member for supporting said apparatus on a surface.

2. The apparatus of claim 1 wherein said frictionally retaining means includes a disc member centrally disposed on said support member and having a number of radially extending slits extending from the periphery thereof toward the center and aligned with said scalloped cutouts, the number of such slits corresponding to the number of cutouts.

3. The apparatus according to claim 2 wherein said support member is a tubular member, said first and second discs have at least three spacer members positioned and attached therebetween, and said support means includes a portion extending beyond said discs for being received within a mating aperture in a surface.

4. The apparatus according to claim 3 wherein said means for support includes a separate member configured for securing to a surface of a fishing craft, said separate member having said mating aperture formed therein.

5. The apparatus of claim 3 wherein said support means includes at least three leg members, each of said leg members being attached to the second disc.

6. A fishing pole apparatus comprising:

a generally elongate generally tubular central support member;

a handle retaining assembly including first and second generally like dimensioned discs having centrally disposed openings by which they are secured to said support member by insertion of said support member therethrough, said discs secured in spaced relation to one another adjacent one end of said support member, the first disc being positioned furthest from said one end and having a plurality of circumferentially arranged openings dimensioned for receiving the handles of the fishing poles therethrough with the other disc being spaced a distance from the first disc sufficient for enabling the handle ends to generally abut thereagainst;

a rod retaining assembly affixed adjacent the other end of said support member, said assembly including frictional means configured for frictionally retaining the shafts of the fishing poles therein in general alignment with the openings in said first disc and with said support member, and further including a disc member, centrally disposed on said support member adhered to said frictional means, having the outer perimeter thereof scalloped to form a number of cutouts equal in number to the number of handle receiving openings in said first disc; and means on said one end of said support member for supporting said apparatus on a surface.

7. The apparatus according to claim 6 wherein said frictionally retaining means is centrally disposed on said support member and includes a resilient disc member having a number of radially extending slits extending from the periphery thereof toward the center in general alignment with said cutouts, the number of such slits corresponding to the number of scalloped cutouts.

8. The apparatus according to claim 7 including at least three spacer members positioned between and attached to said first and second discs.

9. The apparatus according to claim 8 wherein said means for support includes an extending portion of said tubular member configured for being received within a mating aperture and a separate member configured for securing to a surface of a fishing craft, said separate member having said mating aperture formed therein.

10. The apparatus according to claim 8 wherein said means for support includes leg members secured to said second disc.

11. The apparatus according to claim 8 wherein said means for support includes at least three leg members, each of said leg members being threadably attached to one of said spacers in axial alignment therewith.

12. The apparatus according to claim 11 wherein said support member and said first and second discs are formed of metal.

13. The apparatus according to claim 11 wherein said support member is threaded at the other end and said retaining assembly disc member is configured for being threadably attached thereto.

14. A fishing pole apparatus comprising:

a generally elongate central support member;

a handle retaining assembly including first and second generally like dimensioned discs having centrally disposed openings for receiving said support member therethrough, said discs secured on said support member in spaced relation to one another adjacent one end of said support member, the first disc being positioned furthest from said one end and having a plurality of circumferentially arranged openings dimensioned for receiving the handles of the fishing poles therethrough in abutting relation to the second disc;

a rod retaining assembly affixed adjacent the other end of said support member, said assembly including in combination alignment means for receiving and generally aligning the fishing pole shafts with said handle receiving openings, and frictional means configured for frictionally retaining the shafts of the fishing poles in said alignment means:

said alignment means including a disc member centrally disposed on said support member having the outer perimeter thereof scalloped to form a number of cutouts equal in number to the number of handle receiving openings in said first disc for receiving said shafts;

said frictional means is centrally disposed on said support member adjacent said alignment means and includes a partially resilient disc member having a plurality of radially extending slits extending from the periphery thereof toward the center, one in general alignment with each of said cutouts; and support means on said one end of said support member for supporting said apparatus on a surface.

15. The apparatus according to claim 14 wherein said support member is a tubular member, said first and second discs have at least three spacer members positioned and attached therebetween, and said support means includes a portion extending beyond said discs for being received within a mating aperture in a surface.

16. The apparatus according to claim 14 wherein said support member is a tubular member, said first and second discs have at least three spacer members positioned and attached therebetween, and said support means includes leg means on the second disc.

* * * * *